United States Patent
Kameyama et al.

(10) Patent No.: US 10,637,955 B2
(45) Date of Patent: Apr. 28, 2020

(54) RELAY DEVICE, AND RELAY METHOD

(71) Applicant: FUJITSU LIMITED, Kawasaki-shi, Kanagawa (JP)

(72) Inventors: Hiroaki Kameyama, Kawasaki (JP); Shinichi Sazawa, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 16/127,592

(22) Filed: Sep. 11, 2018

(65) Prior Publication Data
US 2019/0014189 A1 Jan. 10, 2019

Related U.S. Application Data

(63) Continuation of application No. PCT/JP2016/059760, filed on Mar. 25, 2016.

(51) Int. Cl.
*H04L 29/08* (2006.01)
*G06F 13/00* (2006.01)
(Continued)

(52) U.S. Cl.
CPC ...... *H04L 67/2847* (2013.01); *G06F 12/0862* (2013.01); *G06F 13/00* (2013.01);
(Continued)

(58) Field of Classification Search
CPC . H04L 67/2847; H04L 67/06; G06F 12/0862; G06F 13/00; G06F 2212/6028; H04B 7/14; H04B 7/15
See application file for complete search history.

(56) References Cited

U.S. PATENT DOCUMENTS 6,282,542 B1 8/2001 Carneal et al.
8,069,225 B2 * 11/2011 McCanne ............... H04L 41/12
706/21
(Continued)

FOREIGN PATENT DOCUMENTS

JP 2001-318902 11/2001
JP 2006-252019 9/2006
(Continued)

OTHER PUBLICATIONS

International Search Report dated Jun. 14, 2016 in Corresponding International Application No. PCT/JP2016/059760.
(Continued)

*Primary Examiner* — Philip J Chea
*Assistant Examiner* — Wuji Chen

(57) ABSTRACT

A relay device includes a first relay device connected to a server and a second relay device connected to a client. The first relay device includes a request unit that requests the server to prefetch data in response to a request from the client; a control unit that caches the data in a first cache; and a notification unit that requests the server to prefetch data in response to a current request from the client, and notifies the second relay device of a predetermined signal when the data matches the data cached in the first cache. The second cache of the second relay device caches a part of the data cached in the first cache. The response unit performs, detecting the predetermined signal, a proxy response to the client with the data cached in the second cache in response to a data request from the client.

3 Claims, 8 Drawing Sheets

(51) Int. Cl.
*G06F 12/0862* (2016.01)
*H04B 7/14* (2006.01)
*H04B 7/15* (2006.01)

(52) U.S. Cl.
CPC ............... *H04B 7/14* (2013.01); *H04L 67/06* (2013.01); *G06F 2212/6028* (2013.01); *H04B 7/15* (2013.01)

(56) References Cited

U.S. PATENT DOCUMENTS

| | | | | |
|---|---|---|---|---|
| 2001/0018649 | A1* | 8/2001 | Kasai | G06F 17/28 704/3 |
| 2003/0120658 | A1* | 6/2003 | Carneal | H04B 7/18582 |
| 2004/0236777 | A1* | 11/2004 | Pardikar | G06F 21/6218 |
| 2006/0215682 | A1 | 9/2006 | Chikusa et al. | |
| 2007/0250601 | A1* | 10/2007 | Amlekar | G06F 16/9574 709/219 |
| 2013/0208651 | A1 | 8/2013 | Fujita | |
| 2014/0279929 | A1* | 9/2014 | Gupta | G06F 11/1471 707/683 |

FOREIGN PATENT DOCUMENTS

| | | |
|---|---|---|
| JP | 2013-218505 | 10/2013 |
| JP | 2014-85822 | 5/2014 |
| WO | WO 2012/042617 A1 | 4/2012 |
| WO | WO 2013/180255 A1 | 12/2013 |
| WO | WO 2014/150538 A1 | 9/2014 |

OTHER PUBLICATIONS

Written Opinion of the International Searching Authority dated Jun. 14, 2016 in Corresponding International Application No. PCT/JP2016/059760.

* cited by examiner

RELAY DEVICE, AND RELAY METHOD

CROSS-REFERENCE TO RELATED APPLICATION

This application is a continuation of International Application No. PCT/JP2016/059760, filed on Mar. 25, 2016, the entire contents of which are incorporated herein by reference.

FIELD

The embodiment discussed herein is related to a relay device, and a relay method.

BACKGROUND

Recently in a file sharing system, a system that enables a client at a remote place to download or upload a file from or to a server has been known. Thus, there is a need for a method for increasing the processing speed needed from a data request to the data acquisition between a client and a server.

As file sharing protocols used for file sharing, Common Internet File System (CIFS)/Server Message Block (SMB) and the like are used. In the case of CIFS, a large number of negotiations for communication messages between a server and a client is needed, and the processing time needed for negotiations is increased as the communication distance between the server and the client is longer. As a result, the processing speed from a data request to the data acquisition corresponding to the data request for file sharing between the server and the client decreases.

Thus, in order to handle such a situation, a high-speed transmission system that increases the processing speed from a data request to the data acquisition is known. FIG. 7 is a sequence diagram illustrating an example of processing operation of a high-speed transmission system 200 performing a relay process. The high-speed transmission system 200 illustrated in FIG. 7 includes a server 201, a server-side relay device 202, a client-side relay device 203, and a client 204.

The client 204 transmits an information acquisition command (GetInfo) to the client-side relay device 203 (step S201). The client-side relay device 203 transmits the received information acquisition command to the server-side relay device 202 (step S202). The server-side relay device 202 transmits the received information acquisition command to the server 201 (step S203).

The server 201 transmits an information acquisition response corresponding to the received information acquisition command to the server-side relay device 202 (step S204). The server-side relay device 202 transmits the received information acquisition response to the client-side relay device 203 (step S205). The client-side relay device 203 transmits the received information acquisition response to the client 204 (step S206).

The client 204 transmits a read command (read 0-99) to the client-side relay device 203 in response to the information acquisition response (step S207). When receiving the read command (read 0-99), the client-side relay device 203 transmits the read command (read 0-99) to the server-side relay device 202 (step S208). When receiving the read command (read 0-99), the server-side relay device 202 transmits the read command (read 0-99) to the server 201 (step S209).

The server 201 reads data (data 0-99) in response to the read command (read 0-99) and transmits the read data (data 0-99) to the server-side relay device 202 (step S210). The server-side relay device 202 transmits the data (data 0-99) to the client-side relay device 203 (step S211). The client-side relay device 203 transmits the data (data 0-99) to the client 204 (step S212).

When transmitting the data (data 0-99) to the client-side relay device 203 in step S211, the server-side relay device 202 transmits a prefetch command (read 100-199) to the server 201 (step S213). The server 201 reads data (data 100-199) in response to the prefetch command (read 100-199) and transmits the read data (data 100-199) to the server-side relay device 202 (step S214). The server-side relay device 202 transmits the data (data 100-199) to the client-side relay device 203 (step S215).

When transmitting the data (data 100-199) to the client-side relay device 203 in step S215, the server-side relay device 202 transmits a prefetch command (read 200-299) to the server 201 (step S216). The server 201 reads data (data 200-299) in response to the prefetch command (read 200-299) and transmits the read data (data 200-299) to the server-side relay device 202 (step S217). The server-side relay device 202 transmits the data (data 200-299) to the client-side relay device 203 (step S218).

When transmitting the data (data 200-299) to the client-side relay device 203 in step S218, the server-side relay device 202 transmits a prefetch command (read 300-399) to the server 201 (step S219). The server 201 reads data (data 300-399) in response to the prefetch command (read 300-399) and transmits the read data (data 300-399) to the server-side relay device 202 (step S220). The server-side relay device 202 transmits the data (data 300-399) to the client-side relay device 203 (step S221).

When transmitting the data (data 300-399) to the client-side relay device 203 in step S221, the server-side relay device 202 transmits a prefetch command (read 400-499) to the server 201 (step S222). The server 201 reads data (data 400-499) in response to the prefetch command (read 400-499) and transmits the read data (data 400-499) to the server-side relay device 202 (step S223). The server-side relay device 202 transmits the data (data 400-499) to the client-side relay device 203 (step S224).

When receiving the data (data 0-99) in step S212, the client 204 transmits a read command (read 100-199) to the client-side relay device 203 (step S225). In response to the read command (read 100-199), the client-side relay device 203 transmits the data (data 100-199) received in step S215 to the client 204 as a proxy response (step S226).

When receiving the data (data 100-199) in step S226, the client 204 transmits a read command (read 200-299) to the client-side relay device 203 (step S227). In response to the read command (read 200-299), the client-side relay device 203 transmits the received data (data 200-299) to the client 204 as a proxy response (step S228).

When receiving the data (data 200-299) in step S228, the client 204 transmits a read command (read 300-399) to the client-side relay device 203 (step S229). In response to the read command (read 300-399), the client-side relay device 203 transmits the received data (data 300-399) to the client 204 as a proxy response (step S230).

When receiving the data (data 300-399) in step S230, the client transmits a read command (read 400-499) to the client-side relay device 203 (step S231). In response to the read command (read 400-499), the client-side relay device 203 transmits the received data (data 400-499) to the client 204 as a proxy response (step S232). The client 204 repeats the series of processes until the acquisition of desired data from the server 201 is completed.

The server-side relay device 202 requests the server 201 to execute a prefetch command in response to a read command from the client 204, and transmits the data acquired by the prefetch command to the client-side relay device 203. The client-side relay device 203 sequentially transmits data acquired by prefetch commands to the client 204 in response to read commands from the client 204. As a result, it is possible to increase the processing speed needed from a data request to the data acquisition.

FIG. 8 is a sequence diagram illustrating an example of processing operation of a high-speed transmission system 300 performing a relay process. The high-speed transmission system 300 illustrated in FIG. 8 includes a server 301, a server-side relay device 302, a client-side relay device 303, and a client 304.

The client 304 transmits a first read command (read 0-99) to the client-side relay device 303 (step S301). The client-side relay device 303 transmits the received read command (read 0-99) to the server-side relay device 302 (step S302). The server-side relay device 302 transmits the received read command (read 0-99) to the server 301 (step S303). The server 301 reads data (data 0-99) in response to the read command (read 0-99) and transmits the read data (data 0-99) to the server-side relay device 302 (step S304). The server-side relay device 302 transmits the data (data 0-99) to the client-side relay device 303 (step S305). The client-side relay device 303 caches the received data (data 0-99) in a cache (step S306), and transmits the cached data (data 0-99) to the client 304 (step S307).

The client 304 transmits a second read command (read 0-99) to the client-side relay device 303 (step S308). When receiving the read command (read 0-99), the client-side relay device 303 transmits the data (data 0-99) cached in the cache to the client 304 (step S309).

When detecting the second and subsequent read commands from the client 304, the client-side relay device 303 transmits the data cached in the cache to the client 304 without transferring the read command to the server 301. As a result, it is possible to increase the processing speed needed from a data request to the data acquisition.

Patent Literature 1: International Publication Pamphlet No. WO 2012/042617

Patent Literature 2: Japanese Laid-open Patent Publication No. 2001-318902

Patent Literature 3: Japanese Laid-open Patent Publication No. 2013-218505

Patent Literature 4: Japanese Laid-open Patent Publication No. 2006-252019

However, in the high-speed transmission system 200 illustrated in FIG. 7, there is no prefetched data in the period from the start of the transmission of a read command of the client 204 in step S207 to the acquisition of the read data corresponding to the read command in step S212. In other words, the client-side relay device 203 is in a standby state for a period until prefetched data is acquired from the server-side relay device 202 in step S212. As a result, the processing speed needed from a data request to the data acquisition is not increased.

In the client-side relay device 303 in the high-speed transmission system 300 illustrated in FIG. 8, the read data is stored in the cache in response to the first data request (read command), and the cached data is transmitted to the client 304 for the second and subsequent data requests. However, the client-side relay device 303 operates based on the assumption that the data in the cache to be downloaded for the first data request is the same as that for the second data request, and a mechanism for determining whether the cache is updated is needed.

SUMMARY

According to an aspect of an embodiment, a relay device includes a first relay device connected to a first communication device and a second relay device connected to a second communication device. The relay device reads data from the first communication device in response to a data request from the second communication device, and relays the read data to the second communication device. The first relay device includes a first processor configured to request the first communication device to prefetch data in response to a request from the second communication device; cache the prefetched data acquired by the prefetch request in a first cache; request the first communication device to prefetch the data in response to a next request from the second communication device, and notify the second relay device of a predetermined signal in the case that the prefetched data acquired by the prefetch request matches the prefetched data cached in the first cache. The second relay device includes a second cache and a second processor configured to cache in the second cache a part of the prefetched data cached in the first cache; and perform, when detecting the predetermined signal, a proxy response to the second communication device with the prefetched data cached in the second cache in response to a data request from the second communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings.

Note that, the disclosed technique is not limited by the present embodiment. Furthermore, the following embodiments may be appropriately combined as long as no contradiction is caused.

Figure 1:
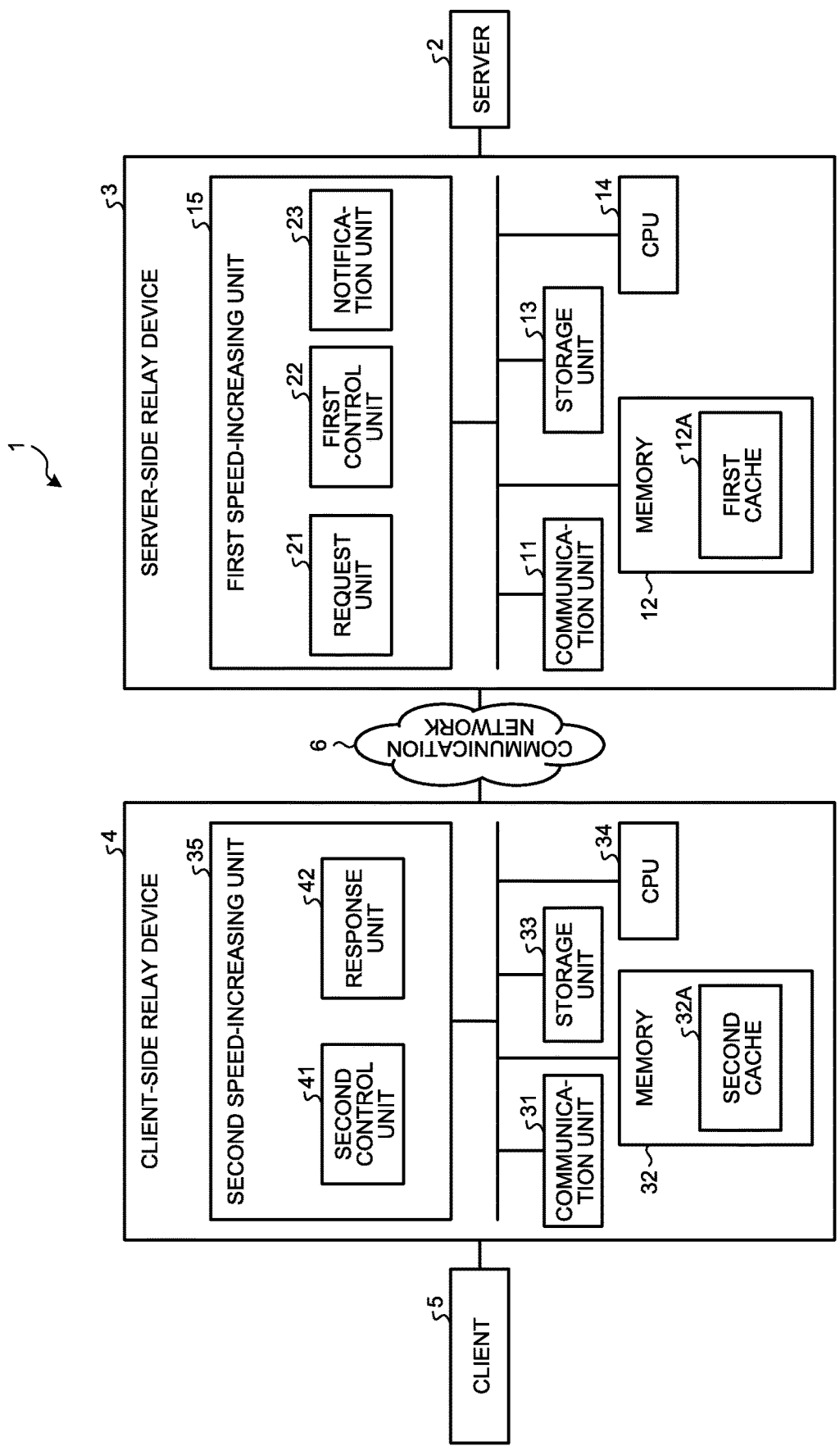
FIG. 1 is an explanatory diagram illustrating an example of a high-speed transmission system in the present embodiment.

FIG. 1 is an explanatory diagram illustrating an example of a high-speed transmission system 1 in the present embodiment. The high-speed transmission system 1 illustrated in FIG. 1 includes a server 2, a server-side relay device 3, a client-side relay device 4, and a client 5. The server-side relay device 3 and the client-side relay device 4 are connected by a communication network 6 such as the Internet or a local area network (LAN). It is assumed that data communication between the server 2 and the client 5 is performed using, for example, a CIFS/SMB communication protocol.

The server 2 is a first communication device such as a computer that manages a database storing downloaded data requested by the client 5. The server-side relay device 3 is a first relay device connected to the server 2 and to the communication network 6. For convenience of explanation, it is assumed that the server-side relay device 3 is arranged, for example, in the vicinity of the server 2, but may be built in the server 2 or may be an application to be developed in a CPU (not illustrated) in the server 2, for example. The server-side relay device 3 includes a communication unit 11, a memory 12, a storage unit 13, a central processing unit (CPU) 14, and a first speed-increasing unit 15. The communication unit 11 is a communication interface that controls communication with the server 2 and with the communication network 6. The storage unit 13 is an area where various kinds of information are stored. The memory 12 is a work area where various kinds of information are stored and processing of the CPU 14 is executed. The memory 12 includes a first cache 12A in which head data to be described later is cached. The CPU 14 controls the entire server-side relay device 3. The first speed-increasing unit 15 is an application that performs a relay process in the server 2.

The first speed-increasing unit 15 includes a request unit 21, a first control unit 22, and a notification unit 23. When an information acquisition response corresponding to an information acquisition command is transmitted from the server 2 to the client-side relay device 4, the request unit 21 requests the server 2 to execute a first prefetch command requesting prefetching head data. Note that the first prefetch command is a command requesting prefetching, for example, head data (data 0-399). The request unit 21 requests the server 2 to execute a prefetch command requesting prefetching the next data (for example, data 400-499).

The first control unit 22 controls the first cache 12A. When there is no prefetched head data in the first cache 12A, the first control unit 22 caches the prefetched head data acquired by the first prefetch command in the first cache 12A.

When the request unit 21 acquires the head data in response to the first prefetch command, the notification unit 23 compares the acquired prefetched head data with the head data cached in the first cache 12A. When the acquired head data matches the head data cached in the first cache 12A, the notification unit 23 notifies the client-side relay device 4 of cache OK. The cache OK is a predetermined signal for permitting the use of data cached in a second cache 32A, which is to be described later, in the client-side relay device 4 in order to perform a proxy response to the client 5 using the head data cached in the second cache 32A.

When the acquired head data does not match the head data cached in the first cache 12A, the notification unit 23 notifies the client-side relay device 4 of cache NG. The cache NG is a signal for prohibiting the use of data cached in the second cache 32A in order to prohibit the second cache 32A in the client-side relay device 4 from performing a proxy response to the client 5 using the head data cached in the second cache 32A.

The client 5 is a second communication device such as a personal computer. The client-side relay device 4 is a second relay device connected to the client 5 and to the communication network 6. For convenience of explanation, it is assumed that the client-side relay device 4 is arranged, for example, in the vicinity of the client 5, but may be built in the client 5 or may be an application to be developed in a CPU (not illustrated) in the client 5, for example. The client-side relay device 4 includes a communication unit 31, a memory 32, a storage unit 33, a CPU 34, and a second speed-increasing unit 35. The communication unit 31 is a communication interface that controls communication with the client 5 and with the communication network 6. The storage unit 33 is an area where various kinds of information are stored. The memory 32 is a work area where various kinds of information are stored and processing of the CPU 34 is executed. The memory 32 includes a second cache 32A. The CPU 34 controls the entire client-side relay device 4. The second speed-increasing unit 35 is an application that performs a relay process in the client 5.

The second speed-increasing unit 35 includes a second control unit 41 and a response unit 42. The second control unit 41 controls the second cache 32A. The second control unit 41 caches, in the second cache 32A, the head data cached in the first cache 12A in the server-side relay device 3. The cache amount of the second cache 32A is the amount of prefetched data that enables performing a proxy response to the client 5 for a time equal to or longer than a round trip time (RTT) needed for a process from the transmission of a first read command from the client 5 to the acquisition of the data corresponding to the read command from the server 2. That is, the cache amount of the second cache 32A can be calculated by the read command speed (bps) of the client 5×RTT (msec)×1000. For convenience of explanation, it is assumed that, in the second cache 32A, the prefetched head data (data 0-399) cached in the first cache 12A is cached. When the head data is in the second cache 32A, the response unit 42 performs a proxy response to the client 5 with the head data in the second cache 32A in response to the read command from the client 5.

Figure 2:
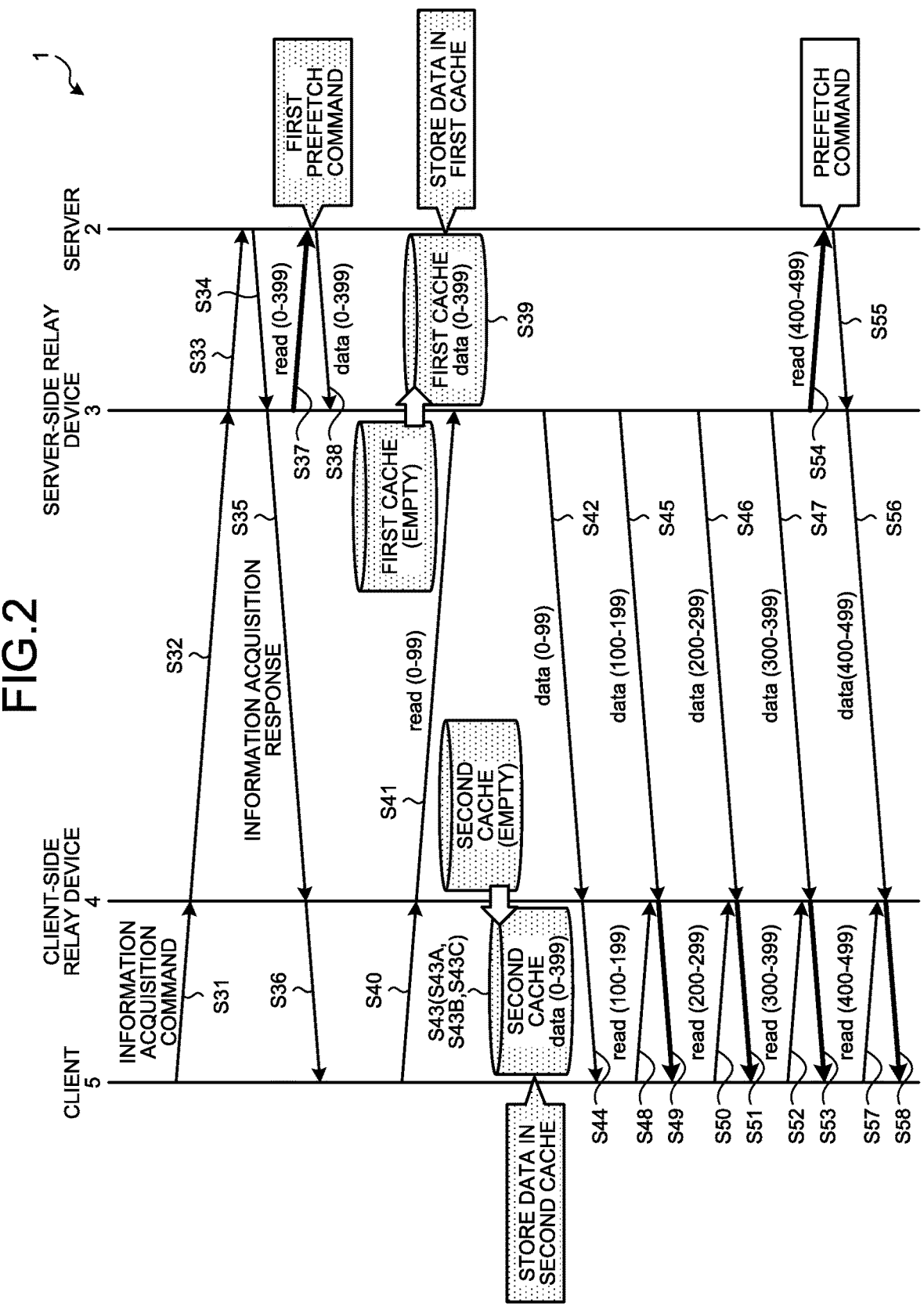
FIG. 2 is a sequence diagram illustrating an example of processing operation of the high-speed transmission system performing a relay process in the case of cache empty.

Next, the operation of the high-speed transmission system 1 in the present embodiment is described. FIG. 2 is a sequence diagram illustrating an example of processing operation of the high-speed transmission system 1 performing a relay process in the case of cache empty. For convenience of explanation, the first cache 12A in the server-side relay device 3 and the second cache 32A in the client-side relay device 4 are in an empty state in which no head data is cached.

The client 5 transmits an information acquisition command to the client-side relay device 4 (step S31). The client-side relay device 4 transmits the received information acquisition command to the server-side relay device 3 (step S32). The server-side relay device 3 transmits the received information acquisition command to the server 2 (step S33).

The server 2 transmits an information acquisition response corresponding to the received information acquisition command to the server-side relay device 3 (step S34). The server-side relay device 3 transmits the received information acquisition response to the client-side relay device 4

(step S35). The client-side relay device 4 transmits the received information acquisition response to the client 5 (step S36).

When transmitting the information acquisition response to the client-side relay device 4 in step S35, the server-side relay device 3 requests the server 2 to execute a first prefetch command (read 0-399) (step S37). The server 2 reads head data (data 0-399) in response to the first prefetch command (read 0-399) and transmits the read head data (data 0-399) to the server-side relay device 3 (step S38).

Since no head data is in the first cache 12A, the server-side relay device 3 caches the head data (data 0-399) received in step S38 in the first cache 12A (step S39). As a result, the head data (data 0-399) is stored in the first cache 12A.

When receiving the information acquisition response in step S36, the client 5 transmits a read command (read 0-99) to the client-side relay device 4 (step S40). The client-side relay device 4 transmits the received read command (read 0-99) to the server-side relay device 3 (step S41).

When receiving the read command (read 0-99) in step S41, the server-side relay device 3 reads the data (data 0-99) corresponding to the read command (read 0-99) from the first cache 12A. Then, the server-side relay device 3 transmits the read data (data 0-99) to the client-side relay device 4 (step S42). Then, the client-side relay device 4 caches the received data (data 0-99) in the second cache 32A (step S43) and transmits the data (data 0-99) to the client 5 (step S44).

After transmitting the data (data 0-99) cached in the first cache 12A to the client-side relay device 4 in step S42, the server-side relay device 3 reads the data (data 100-199) cached in the first cache 12A. Then, the server-side relay device 3 transmits the read data (data 100-199) to the client-side relay device 4 (step S45). Then, the client-side relay device 4 caches the received data (data 100-199) in the second cache 32A (step S43A).

After transmitting the data (data 100-199) cached in the first cache 12A to the client-side relay device 4 in step S45, the server-side relay device 3 reads the data (data 200-299) cached in the first cache 12A. Then, the server-side relay device 3 transmits the read data (data 200-299) to the client-side relay device 4 (step S46). Then, the client-side relay device 4 caches the received data (data 200-299) in the second cache 32A (step S43B).

After transmitting the data (data 200-299) cached in the first cache 12A to the client-side relay device 4 in step S46, the server-side relay device 3 reads the data (data 300-399) cached in the first cache 12A. Then, the server-side relay device 3 transmits the read data (data 300-399) to the client-side relay device 4 (step S47). Then, the client-side relay device 4 caches the received data (data 300-399) in the second cache 32A (step S43C). As a result, the same head data (data 0-399) as that in the first cache 12A has been cached in the second cache 32A.

When receiving the data (data 0-99) in step S44, the client 5 transmits a next read command (read 100-199) to the client-side relay device 4 (step S48). The client-side relay device 4 reads the data (data 100-199) corresponding to the received read command (read 100-199) from the second cache 32A. Then, the client-side relay device 4 transmits the read data (data 100-199) to the client 5 as a proxy response (step S49).

When receiving the data (data 100-199) in step S49, the client 5 transmits a next read command (read 200-299) to the client-side relay device 4 (step S50). The client-side relay device 4 reads the data (data 200-299) corresponding to the received read command (read 200-299) from the second cache 32A. The client-side relay device 4 transmits the read data (data 200-299) to the client 5 as a proxy response (step S51).

When receiving the data (data 200-299) in step S51, the client 5 transmits a next read command (read 300-399) to the client-side relay device 4 (step S52). The client-side relay device 4 reads the data (data 300-399) corresponding to the received read command (read 300-399) from the second cache 32A. The client-side relay device 4 transmits the read data (data 300-399) to the client 5 as a proxy response (step S53).

After transmitting the data (data 300-399) to the client-side relay device 4 in step S53, the server-side relay device 3 transmits a prefetch command (read 400-499) to the server 2 (step S54). The server 2 reads data (data 400-499) in response to the prefetch command (read 400-499) and transmits the read data (data 400-499) to the server-side relay device 3 (step S55).

The server-side relay device 3 transmits the read data (data 400-499) to the client-side relay device 4 (step S56). Then, when receiving the proxy response (data 300-399) in step S53, the client 5 transmits a next read command (read 400-499) to the client-side relay device 4 (step S57). The client-side relay device 4 transmits the received data (data 400-499) corresponding to the read command (read 400-499) to the client 5 as a proxy response (step S58). The client 5 repeats the series of processes until all the desired data can be acquired from the server 2.

The server-side relay device 3 illustrated in FIG. 2 requests the server 2 to execute a first prefetch command when transmitting an information acquisition response to an information acquisition command to the client-side relay device 4, and acquires the prefetched data corresponding to the first prefetch command. When the first cache 12A is empty, the server-side relay device 3 caches the acquired prefetched data in the first cache 12A. The client-side relay device 4 sequentially acquires the prefetched data from the first cache 12A and sequentially caches the acquired prefetched data in the second cache 32A. As a result, the same prefetched data can be cached in the first cache 12A in the server-side relay device 3 and in the second cache 32A in the client-side relay device 4. Since the client-side relay device 4 can perform a proxy response to the client 5 using the head data cached in the second cache 32A, it is possible to increase the processing speed from a data request to the data acquisition at the first stage.

Figure 3:
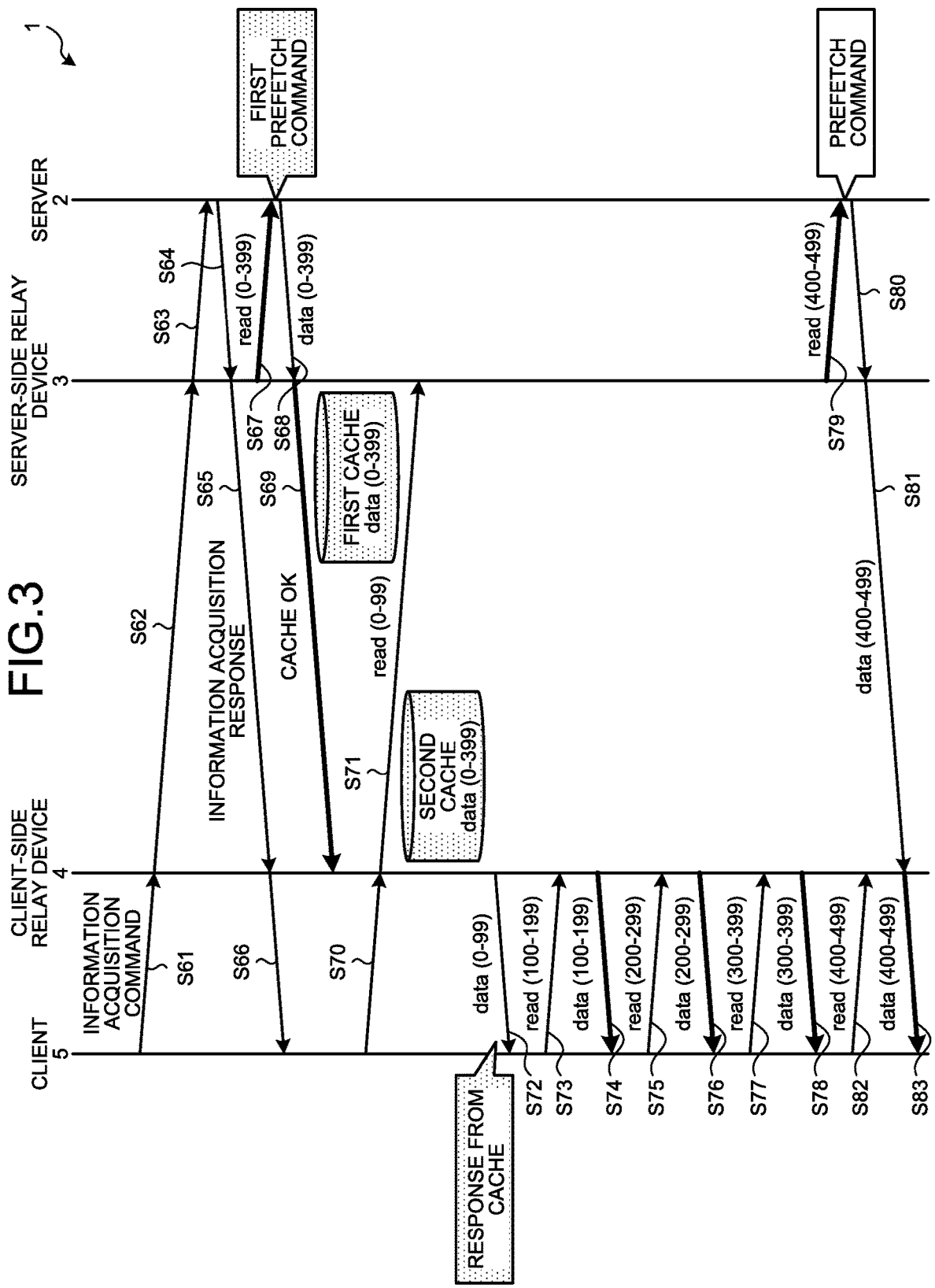
FIG. 3 is a sequence diagram illustrating an example of processing operation of the high-speed transmission system performing a relay process in the case of cache OK.

FIG. 3 is a sequence diagram illustrating an example of processing operation of the high-speed transmission system 1 performing a relay process in the case of cache OK. For convenience of explanation, it is assumed that the same head data (data 0-399) is cached in the first cache 12A in the server-side relay device 3 and in the second cache 32A in the client-side relay device 4.

The client 5 transmits an information acquisition command to the client-side relay device 4 (step S61). The client-side relay device 4 transmits the received information acquisition command to the server-side relay device 3 (step S62). The server-side relay device 3 transmits the received information acquisition command to the server 2 (step S63).

The server 2 transmits an information acquisition response corresponding to the received information acquisition command to the server-side relay device 3 (step S64). The server-side relay device 3 transmits the received information acquisition response to the client-side relay device 4 (step S65). The client-side relay device 4 receives the received information acquisition response (step S66).

When transmitting the information acquisition response to the client-side relay device 4 in step S65, the server-side relay device 3 transmits a first prefetch command (read 0-399) to the server 2 (step S67). The server 2 reads head data (data 0-399) in response to the first prefetch command (read 0-399) and transmits the read head data (data 0-399) to the server-side relay device 3 (step S68).

The server-side relay device 3 compares the received head data (data 0-399) with the head data cached in the first cache 12A. When the received head data matches the head data cached in the first cache 12A, the server-side relay device 3 transmits cache OK to the client-side relay device 4 (step S69).

When receiving the information acquisition response in step S66, the client 5 transmits a read command (read 0-99) to the client-side relay device 4 (step S70). The client-side relay device 4 transmits the received read command (read 0-99) to the server-side relay device 3 (step S71).

When receiving the cache OK in step S69, the client-side relay device 4 performs a proxy response with the head data cached in the second cache 32A. In other words, when receiving the read command (read 0-99) in step S70, the client-side relay device 4 reads the data (data 0-99) corresponding to the read command (read 0-99) from the second cache 32A. Then, the client-side relay device 4 transmits the read data (data 0-99) to the client 5 (step S72).

When receiving the data (data 0-99) in step S72, the client 5 transmits a next read command (read 100-199) to the client-side relay device 4 (step S73). When receiving the read command (read 100-199), the client-side relay device 4 reads the data (data 100-199) corresponding to the read command (read 100-199) from the second cache 32A. Then, the client-side relay device 4 transmits the read data (data 100-199) to the client 5 as a proxy response (step S74).

When receiving the data (data 100-199) in step S74, the client 5 transmits a next read command (read 200-299) to the client-side relay device 4 (step S75). The client-side relay device 4 reads the data (data 200-299) corresponding to the read command (read 200-299) from the second cache 32A. Then, the client-side relay device 4 transmits the read data (data 200-299) to the client 5 as a proxy response (step S76).

When receiving the data (data 200-299) in step S76, the client 5 transmits a next read command (read 300-399) to the client-side relay device 4 (step S77). The client-side relay device 4 reads the data (data 300-399) corresponding to the read command (read 300-399) from the second cache 32A. Then, the client-side relay device 4 transmits the read data (data 300-399) to the client 5 as a proxy response (step S78).

After receiving the read command (read 0-99) in step S71, the server-side relay device 3 transmits a prefetch command (read 400-499) to the server 2 (step S79). The server 2 reads data (data 400-499) in response to the prefetch command (read 400-499) and transmits the read data (data 400-499) to the server-side relay device 3 (step S80).

The server-side relay device 3 transmits the read data (data 400-499) to the client-side relay device 4 (step S81). Then, when receiving the proxy response (data 300-399) in step S78, the client 5 transmits a read command (read 400-499) to the client-side relay device 4 (step S82). The client-side relay device 4 transmits the received data (data 400-499) corresponding to the read command (read 400-499) to the client 5 as a proxy response (step S83). The client 5 repeats the series of processes until all the desired data can be acquired from the server 2.

The server-side relay device 3 illustrated in FIG. 3 compares the prefetched data acquired in response to the first prefetch command with the prefetched data cached in the first cache 12A. When the prefetched data matches the prefetched data cached in the first cache 12A, the server-side relay device 3 notifies the client-side relay device 4 of cache OK. When receiving the cache OK, the client-side relay device 4 performs a proxy response with the prefetched data cached in the second cache 32A in response to the read command from the client 5. As a result, it is possible to increase the processing speed from a data request to the data acquisition at the first stage. It is possible to increase not only the processing speed at first stage, but also the processing speed from a data request to the data acquisition between the client 5 and the server 2.

Figure 4:
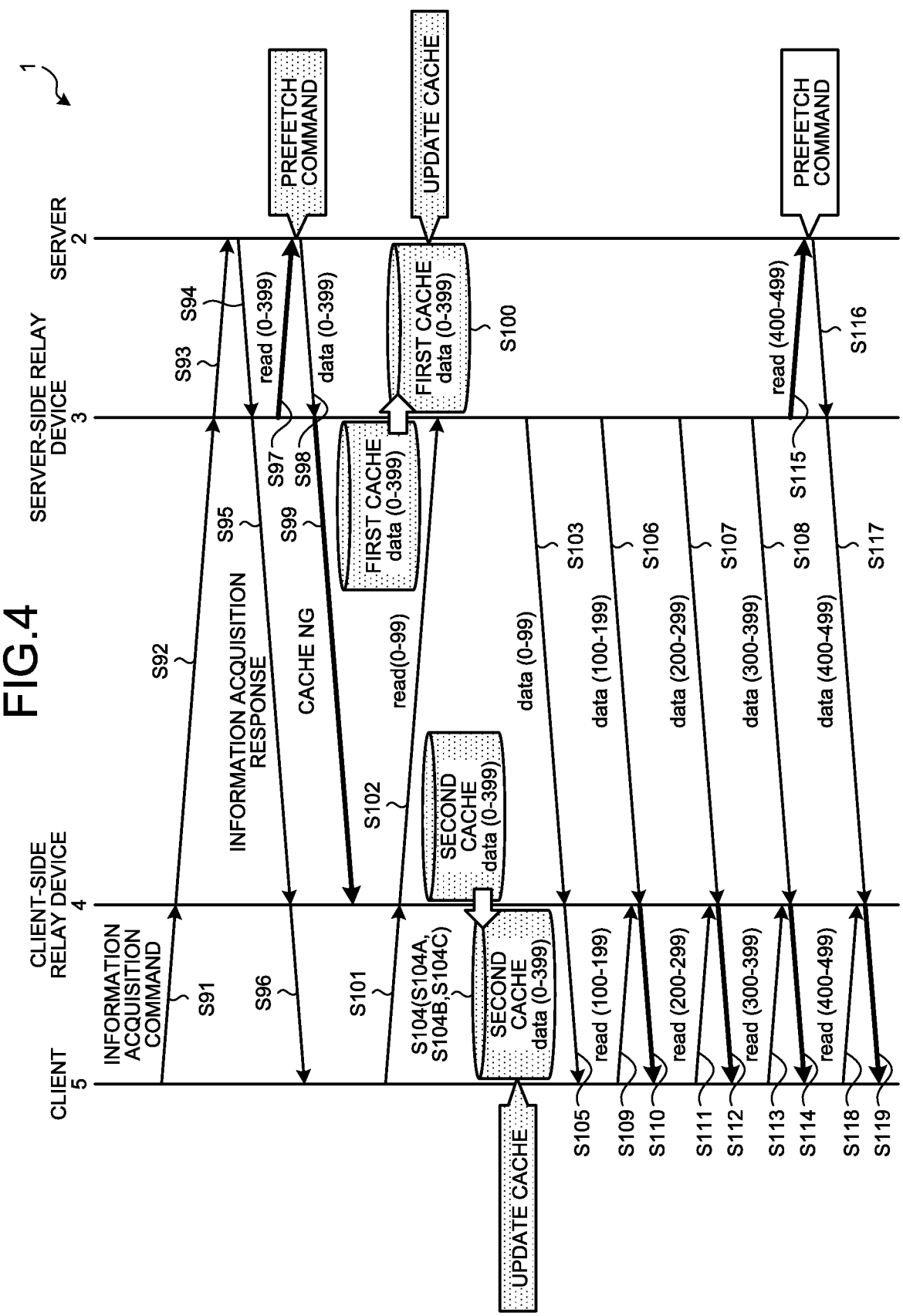
FIG. 4 is a sequence diagram illustrating an example of processing operation of the high-speed transmission system performing a relay process in the case of cache NG.

FIG. 4 is a sequence diagram illustrating an example of processing operation of the high-speed transmission system 1 performing a relay process in the case of cache NG. For convenience of explanation, it is assumed that head data is cached in the first cache 12A in the server-side relay device 3 and the second cache 32A in the client-side relay device 4.

The client 5 transmits an information acquisition command to the client-side relay device 4 (step S91). The client-side relay device 4 transmits the received information acquisition command to the server-side relay device 3 (step S92). The server-side relay device 3 transmits the received information acquisition command to the server 2 (step S93).

The server 2 transmits an information acquisition response corresponding to the received information acquisition command to the server-side relay device 3 (step S94). The server-side relay device 3 transmits the received information acquisition response to the client-side relay device 4 (step S95). The client-side relay device 4 transmits the received information acquisition response to the client 5 (step S96).

When transmitting the information acquisition response to the client-side relay device 4 in step S95, the server-side relay device 3 requests the server 2 to execute a first prefetch command (read 0-399) (step S97). The server 2 reads head data (data 0-399) in response to the first prefetch command (read 0-399) and transmits the read head data (data 0-399) to the server-side relay device 3 (step S98).

The server-side relay device 3 compares the received head data (data 0-399) with the head data cached in the first cache 12A. When the received head data does not match the head data cached in the first cache 12A, the server-side relay device 3 transmits cache NG to the client-side relay device 4 (step S99). The server-side relay device 3 updates the first cache 12A with the received head data (data 0-399) (step S100). When receiving the cache NG from the server-side relay device 3, the client-side relay device 4 clears the content in the second cache 32A.

When receiving the information acquisition response in step S96, the client 5 transmits a read command (read 0-99) to the client-side relay device 4 (step S101). The client-side relay device 4 transmits the received read command (read 0-99) to the server-side relay device 3 (step S102).

When receiving the read command (read 0-99) in step S102, the server-side relay device 3 reads the data (data 0-99) corresponding to the read command (read 0-99) from the first cache 12A. Then, the server-side relay device 3 transmits the read data (data 0-99) to the client-side relay device 4 (step S103). Then, the client-side relay device 4 caches the received data (data 0-99) in the second cache 32A (step S104) and transmits the data (data 0-99) to the client 5 (step S105).

After transmitting the data (data 0-99) cached in the first cache 12A to the client-side relay device 4 in step S103, the server-side relay device 3 reads the data (data 100-199) cached in the first cache 12A. Then, the server-side relay device 3 transmits the read data (data 100-199) to the client-side relay device 4 (step S106). Then, the client-side relay device 4 caches the received data (data 100-199) in a second cache 32A (step S104A).

After transmitting the data (data 100-199) cached in the first cache 12A to the client-side relay device 4 in step S106, the server-side relay device 3 reads the data (data 200-299) cached in the first cache 12A. Then, the server-side relay device 3 transmits the read data (data 200-299) to the client-side relay device 4 (step S107). Then, the client-side relay device 4 caches the received data (data 200-299) in the second cache 32A (step S104B).

After transmitting the data (data 200-299) cached in the first cache 12A to the client-side relay device 4 in step S107, the server-side relay device 3 reads the data (data 300-399) cached in the first cache 12A. Then, the server-side relay device 3 transmits the read data (data 300-399) to the client-side relay device 4 (step S108). Then, the client-side relay device 4 caches the received data (data 300-399) in the second cache 32A (step S104C). As a result, the same head data (data 0-399) as that in the first cache 12A is cached in the second cache 32A.

When receiving the data (data 0-99) in step S105, the client 5 transmits a next read command (read 100-199) to the client-side relay device 4 (step S109). When receiving the read command (read 100-199), the client-side relay device 4 reads the data (data 100-199) corresponding to the read command (read 100-199) from the second cache 32A. Then, the client-side relay device 4 transmits the read data (data 100-199) to the client 5 as a proxy response (step S110).

When receiving the data (data 100-199) in step S110, the client 5 transmits a next read command (read 200-299) to the client-side relay device 4 (step S111). When receiving the read command (read 200-299), the client-side relay device 4 reads the data (data 200-299) corresponding to the read command (read 200-299) from the second cache 32A. Then, the client-side relay device 4 transmits the read data (data 200-299) to the client 5 as a proxy response (step S112).

When receiving the data (data 200-299) in step S112, the client 5 transmits a next read command (read 300-399) to the client-side relay device 4 (step S113). When receiving the read command (read 300-399), the client-side relay device 4 reads the data (data 300-399) corresponding to the read command (read 300-399) from the second cache 32A. Then, the client-side relay device 4 transmits the read data (data 300-399) to the client 5 as a proxy response (step S114).

After transmitting the data (data 300-399) to the client-side relay device 4 in step S108, the server-side relay device 3 transmits a prefetch command (read 400-499) to the server 2 (step S115). The server 2 reads data (data 400-499) in response to the prefetch command (read 400-499) and transmits the read data (data 400-499) to the server-side relay device 3 (step S116).

The server-side relay device 3 transmits the read data (data 400-499) to the client-side relay device 4 (step S117). When receiving the proxy response (data 300-399) in step S114, the client 5 transmits a read command (read 400-499) to the client-side relay device 4 (step S118). The client-side relay device 4 transmits the received data (data 400-499) corresponding to the read command (read 400-499) to the client 5 as a proxy response (step S119). The client 5 repeats the series of processes until all the desired data can be acquired from the server 2.

The server-side relay device 3 illustrated in FIG. 4 compares the current prefetched data acquired in response to the first prefetch command with the prefetched data cached in the first cache 12A. When the current prefetched data does not match the prefetched data cached in the first cache 12A, the server-side relay device 3 notifies the client-side relay device 4 of cache NG. The server-side relay device 3 updates the first cache with the current prefetched data. Then, the client-side relay device 4 sequentially acquires the prefetched data from the updated first cache 12A and sequentially updates the second cache 32A with the acquired prefetched data. As a result, the same prefetched data can be cached in the first cache 12A in the server-side relay device 3 and in the second cache 32A in the client-side relay device 4. Since the client-side relay device 4 can perform a proxy response to the client 5 using the head data cached in the second cache 32A, it is possible to increase the processing speed from a data request to the data acquisition at the first stage.

Figure 5:
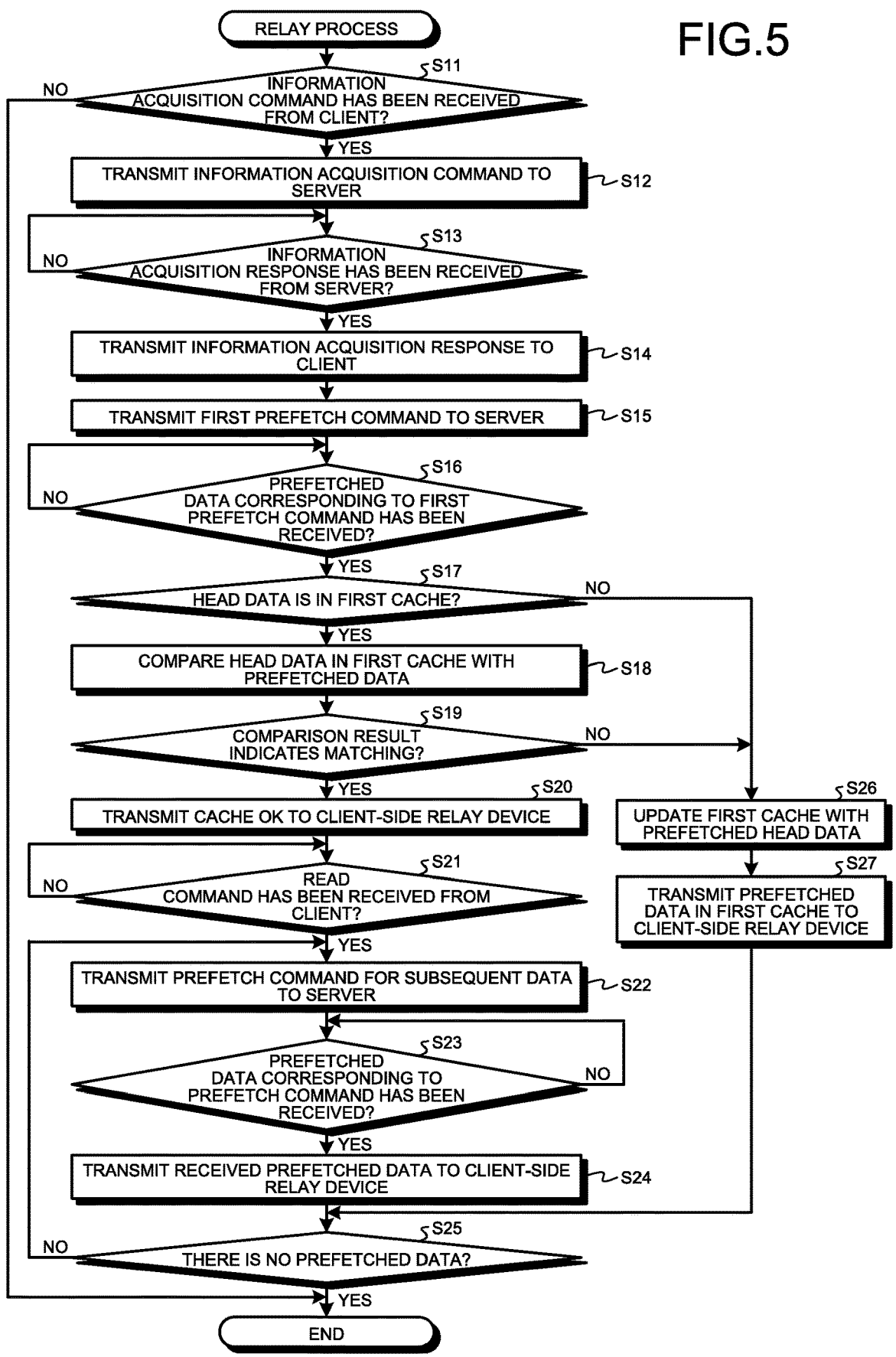
FIG. 5 is a flowchart illustrating an example of processing operation of a server-side relay device performing a relay process.

FIG. 5 is a flowchart illustrating an example of processing operation of the server-side relay device 3 performing a relay process. In FIG. 5, the first speed-increasing unit 15 in the server-side relay device 3 determines whether an information acquisition command has been received from the client-side relay device 4 (step S11). When the information acquisition command has been received (Yes in step S11), the first speed-increasing unit 15 transmits the information acquisition command to the server 2 (step S12).

The first speed-increasing unit 15 determines whether an information acquisition response to the information acquisition command has been received from the server 2 (step S13). When the information acquisition response has been received (Yes in step S13), the first speed-increasing unit 15 transmits the information acquisition response to the client-side relay device 4 (step S14).

The request unit 21 in the first speed-increasing unit 15 transmits a first prefetch command to the server 2 (step S15), and determines whether the prefetched data corresponding to the first prefetch command has been received (step S16). When the prefetched data has been received (Yes in step S16), the first control unit 22 in the first speed-increasing unit 15 determines whether the head data is in the first cache 12A (step S17).

When the head data is in the first cache 12A (Yes in step S17), the notification unit 23 in the first speed-increasing unit 15 compares the head data in the first cache 12A with the received prefetched data (step S18). The notification unit 23 determines whether the head data in the first cache 12A matches the received prefetched data (step S19).

When the head data in the first cache 12A matches the received prefetched data, the notification unit 23 notifies the client-side relay device 4 of cache OK (step S20). The request unit 21 determines whether a read command has been received from the client-side relay device 4 (step S21). When the read command has been received (Yes in step S21), the request unit 21 transmits a prefetch command for the subsequent data to the server 2 (step S22).

The first speed-increasing unit 15 determines whether the prefetched data corresponding to the prefetch command has been received (step S23). When the prefetched data has been received (Yes in step S23), the first speed-increasing unit 15 transmits the received prefetched data to the client-side relay device 4 (step S24). Then, the first speed-increasing unit 15 determines whether there is no prefetched data (step S25). When there is no prefetched data (Yes in step S25), the first speed-increasing unit 15 terminates the processing operation illustrated in FIG. 5.

When there is not no prefetched data (No in step S25), the first speed-increasing unit 15 proceeds to step S22 to transmit a prefetch command for the subsequent data to the server 2. When the information acquisition command has not been received from the client-side relay device 4 (No in step S11), a first speed-increasing unit 15 terminates the processing operation illustrated in FIG. 5. When the information acquisition response has not been received from the server (No in step S13), the first speed-increasing unit 15 proceeds to step S13 to determine whether the information acquisition response has been received.

When the prefetched data corresponding to the first prefetch command has not been received (No in step S16), the first speed-increasing unit 15 proceeds to step S16 to determine whether the prefetched data corresponding to the first prefetch command has been received.

When there is no head data in the first cache 12A (No in step S17), the first control unit 22 updates the first cache 12A with the prefetched head data (step S26). Then, the first speed-increasing unit 15 transmits the prefetched data in the first cache 12A to the client-side relay device 4 (step S27), and proceeds to step S25 to determine whether there is no prefetched data.

When the comparison result indicates unmatching (No in step S19), the first control unit 22 proceeds to step S26 to update the first cache 12A with the prefetch head data. When the read command has not been received from the client-side relay device (No in step S21), the first speed-increasing unit 15 proceeds to step S21 to determine whether the read command has been received. When the prefetched data corresponding to the prefetch command has not been received (No in step S23), the first speed-increasing unit 15 proceeds to step S23 to determine whether the prefetched data corresponding to the prefetch command has been received.

The server-side relay device 3 compares the prefetched data acquired in response to the first prefetch command with the prefetched data cached in the first cache 12A. When the prefetched data matches the prefetched data cached in the first cache 12A, the server-side relay device 3 notifies the client-side relay device 4 of cache OK. When receiving the cache OK, the client-side relay device 4 performs a proxy response with the data cached in the second cache 32A in response to the read command from the client 5. As a result, it is possible to increase the processing speed from a data request to the data acquisition at the first stage.

The server-side relay device 3 in the high-speed transmission system 1 in the present embodiment compares the current prefetched data acquired in response to the first prefetch command with the prefetched data cached in the first cache 12A. When the current prefetched data matches the prefetched data cached in the first cache 12A, the server-side relay device 3 notifies the client-side relay device 4 of cache OK. When receiving the cache OK, the client-side relay device 4 performs a proxy response with the data cached in the second cache 32A in response to the read command from the client 5. As a result, it is possible to increase the processing speed from a data request to the data acquisition at the first stage.

When the high-speed transmission system 1 is applied to a file sharing system between remote locations, the processing speed (download speed) from a data request to the data acquisition is increased. With the high-speed transmission system 1, as the size of data to be downloaded is smaller, the effect of increasing the processing speed from a data request to the data acquisition is larger. For example, when the RTT between the client 5 and the server 2 is 100 msec and 100 Kbytes of data is downloaded, the processing time can be shortened from 0.2 sec to 0.1 sec. For example, when the number of pieces of data is 100, 20 seconds can be shortened to 10 seconds.

Figure 8:
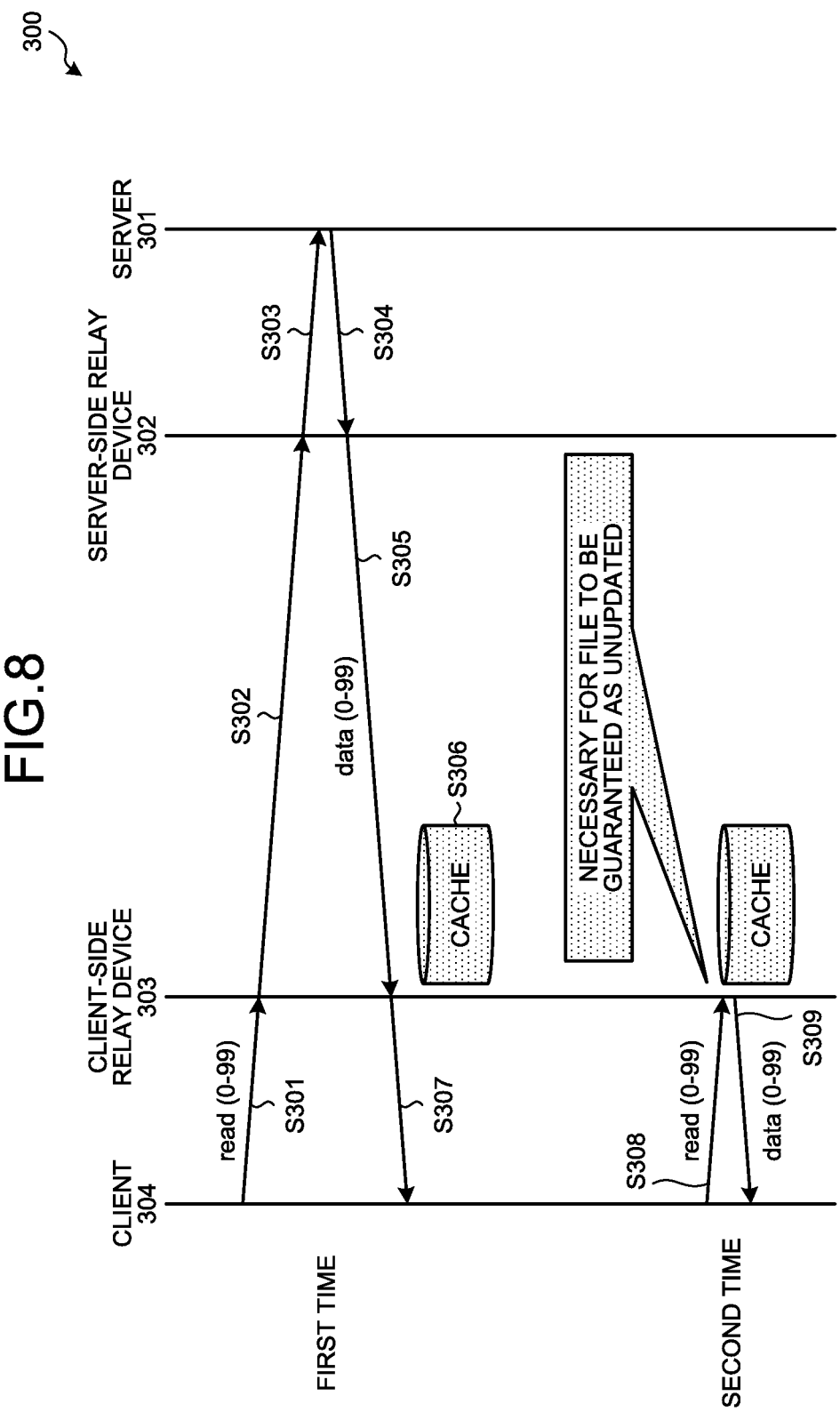
FIG. 8 is a sequence diagram illustrating an example of processing operation of a high-speed transmission system performing a relay process.

As compared with the conventional high-speed transmission system 300 illustrated in FIG. 8, the client-side relay device 4 does not need to cache an entire file, and it is possible to reduce the amount of storage needed for caching.

In the above embodiment, it has been exemplified that the server-side relay device 3 requests the server 2 to prefetch data 0-399 as a first prefetch command, but the amount of prefetched data is not limited to 0-399 and can be appropriately changed.

It has been exemplified, that the same data as the head data 0-399 cached in the first cache 12A is cached in the second cache 32A. However, the second cache 32A may be used for a part of the head data cached in the first cache 12A, for example, data 0-299 to be cached, and data to be cached can be appropriately changed in consideration of the RTT from the above data request to the data acquisition. It has been exemplified that the server-side relay device 3 requests the server 2 to execute a first prefetch command when transmitting an information acquisition response to the client-side relay device 4, but the request is not limited to this timing, and may be made at the timing when an information acquisition response is received from the server 2, and can be changed to an appropriate timing.

It has been exemplified that the server-side relay device 3 clears the content of the first cache 12A when the current prefetched data acquired by the request unit 21 is different from the prefetched data cached in the first cache 12A, and caches the current prefetched data in the first cache 12A. However, the server-side relay device 3 may notify the client 5 of an alarm without clearing the cache in the first cache 12A when the current prefetched data is different from the prefetched data cached in the first cache 12A. Alternatively, the server-side relay device 3 may clear the cache in the first cache 12A and cache the current prefetched data in a first cache 12A when the current prefetched data is different from the prefetched data cached in the first cache 12A and only when a predetermined condition is satisfied.

In the above embodiment, it has been exemplified that the server 2 is a communication device such as a computer, but the various functions and information of the server 2 may be implemented by cloud computing.

It has been exemplified that the CIFS/SMB file sharing protocol is used in the high-speed transmission system 1 in the above embodiment, but the protocol is not limited thereto, and may be, for example, Network File System (NFS) or Apple Filing Protocol (AFP), and can be appropriately changed.

In the high-speed transmission system 1, the CIFS/SMB has been exemplified as a file sharing protocol. However, the present invention is not limited to the file sharing protocol, and is also applicable to protocols such as Hypertext Transfer Protocol (HTTP), File Transfer Protocol (FTP), and Messaging Application Programming Interface (MAPI). The present invention is also applicable to protocols such as Internet Message Access Protocol (IMAP), Post Office Protocol (POP), Simple Mail Transfer Protocol (SMTP), and Lightweight Directory Access Protocol (LDAP).

In addition, each constituent element of the units illustrated in the drawing is not necessarily physically configured as illustrated in the drawing. In other words, a specific form in distribution and integration of the units is not limited to that illustrated in the drawings, and all or a part thereof may be configured by being distributed or integrated functionally or physically in arbitrary units depending on various loads, usage conditions, or the like.

Furthermore, all or an arbitrary part of the various processing functions performed in the server-side relay device 3 may be performed in a central processing unit (CPU) (or a micro-computer such as a micro processing unit (MPU) or a micro controller unit (MCU)). Furthermore, it is needless to say that all or an arbitrary part of the various processing functions may be performed by a program analyzed and executed by a CPU (or a micro-computer such as an MPU or an MCU), or by hardware based on the wired logic.

Figure 6:
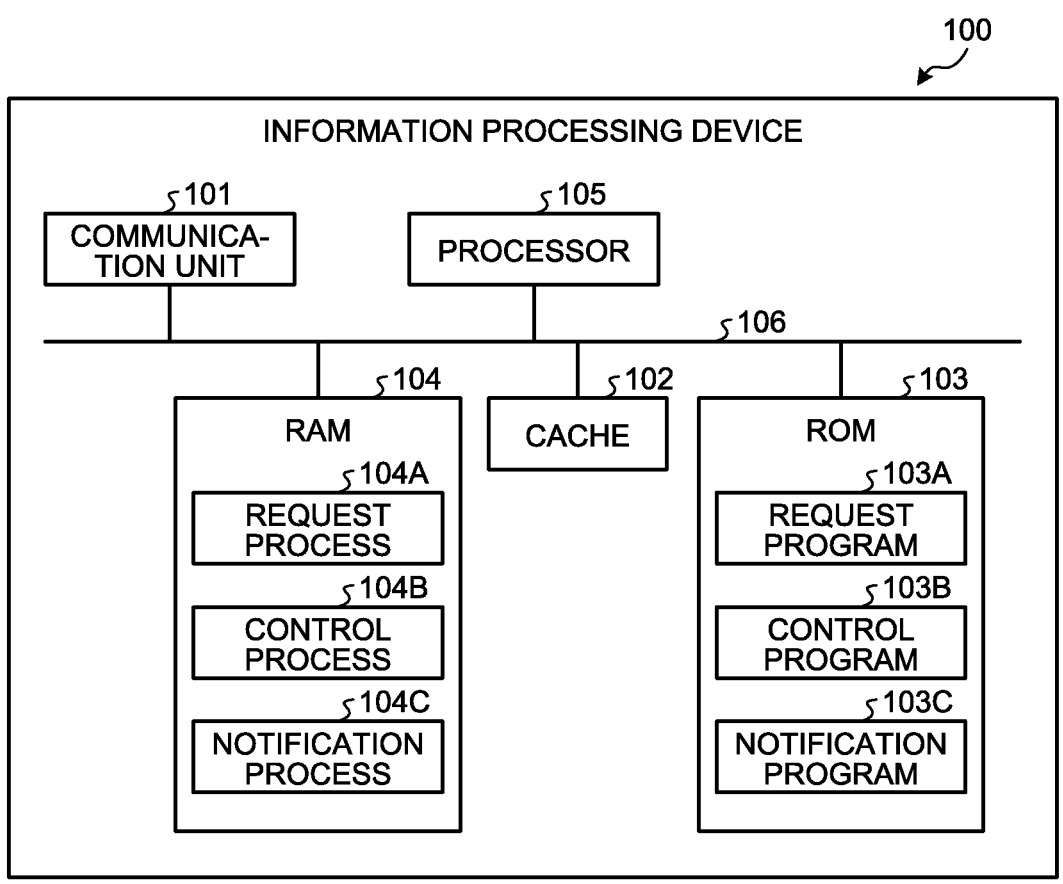
FIG. 6 is an explanatory diagram illustrating an example of an information processing device that executes a relay program.
Figure 7:
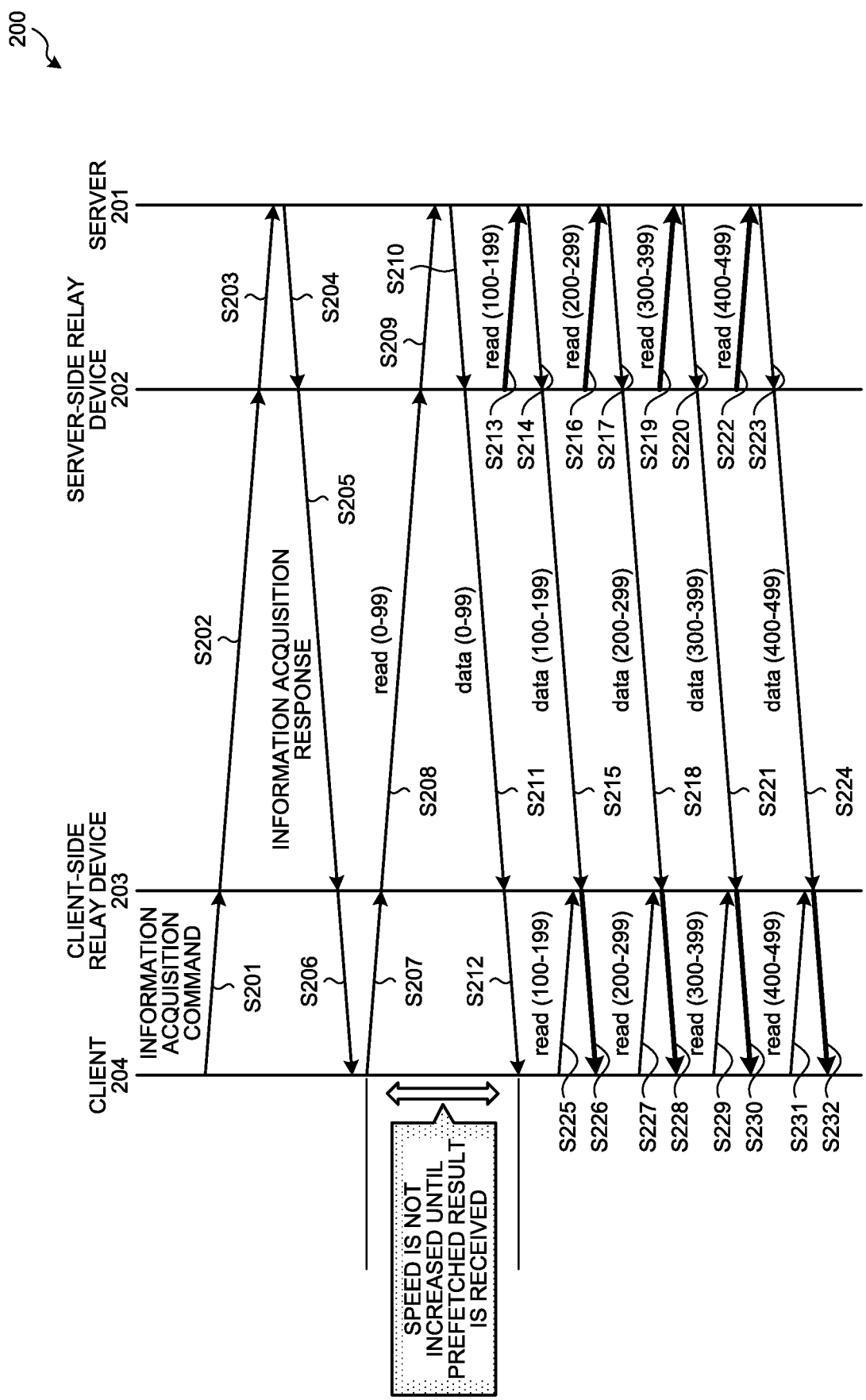
FIG. 7 is a sequence diagram illustrating an example of processing operation of a high-speed transmission system performing a relay process.

Incidentally, the various processes described in the present embodiment can be implemented by a computer executing a program prepared in advance. Thus, an example of an information processing device such as a computer that executes a program having a similar function to that in the above embodiment is described below. FIG. 6 is an explanatory diagram illustrating an example of an information processing device 100 that executes a relay program.

In FIG. 6, the information processing device 100 that executes the relay program includes a communication unit 101, a cache 102, a ROM 103, a RAM 104, a processor 105, and a bus 106. The information processing device 100 is connected to a first communication device, reads data from the first communication device in response to a data request from a second communication device, and relays the read data to the second communication device.

The ROM 103 stores, in advance, a relay program having a similar function to that in the above embodiment. Note that, instead of the ROM 103, a recording medium readable by a drive (not illustrated) may store a processing program. The recording medium may be, for example, a portable recording media such as a CD-ROM, a DVD disk, a USB memory, or an SD card, or a semiconductor memory such as a flash memory. The processing program includes a request program 103A, a control program 103B, and a notification program 103C. Note that, the request program 103A, the control program 103B, and the notification program 103C may be appropriately integrated or distributed. The information processing device 100 may acquire and execute the relay program from these portable physical media. Alternatively, the relay program may be stored in other computers or the like connected to the information processing device 100 via a public line, the Internet, a LAN, a WAN, or the like and executed by the information processing device 100 acquiring the relay program from the computers or the like.

Then, the processor 105 reads the request program 103A, the control program 103B, and the notification program 103C from the ROM 103, and develops these read programs in the RAM 104. The processor 105 causes the request program 103A, the control program 103B, and the notification program 103C to function as a request process 104A, a control process 104B, and a notification process 104C in the RAM 104. Note that, in the processor 105, all the processing units described in the present embodiment do not necessarily operate, and it is only needed to virtually implement a processing unit corresponding to a process to be performed.

The processor 105 requests the first communication device to prefetch data in response to a request from the second communication device. The processor 105 caches the prefetched data acquired by the prefetch request in the cache 102. The processor 105 requests the first communication device to prefetch data in response to a current request from the second communication device. When the current prefetched data acquired by the prefetch request matches the prefetched data cached in the cache 102, the processor 105 notifies another relay device connected to the second communication device of a predetermined signal instructing a proxy response to the second communication device with the prefetched data cached in the cache in the other relay device in response to the data request from the second communication device. As a result, it is possible to shorten the processing time needed from the data request to the data acquisition.

As one aspect, it is possible to increase the processing speed needed from a data request to the data acquisition.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay device that comprises a first relay device connected to a first communication device and a second relay device connected to a second communication device, reads data from the first communication device in response to a data request from the second communication device, and relays the read data to the second communication device, wherein
the first relay device comprises a first processor configured to:
send a first request to request the first communication device to prefetch data in response to the data request from the second communication device;
cache the prefetched data acquired by the prefetch request in a first cache; and
send a second request to request the first communication device to prefetch the data in response to a next request from the second communication device, and notify the second relay device of a predetermined signal in the case that the prefetched data acquired by the prefetch request matches the prefetched data cached in the first cache, and
the second relay device comprises a second cache and a second processor configured to:
cache in the second cache a part of the prefetched data cached in the first cache; and
perform, when detecting the predetermined signal, a proxy response to the second communication device with the prefetched data cached in the second cache in response to a data request from the second communication device, the second cache to cache an amount of the prefetched data that enables performing the proxy response to the second communication device for a time equal to or longer than a processing time needed from a start of the data request from the second communication device to the first communication device to data acquisition by the first communication device for the second communication device.

2. A relay device that is connected to a first communication device, reads data from the first communication device in response to a data request from a second communication device, and relays the read data to the second communication device, the relay device comprising a processor configured to:
send a first request to request the first communication device to prefetch data in response to the data request from the second communication device;
cache the prefetched data acquired by the prefetch request in a first cache; and send a second request to request the first communication device to prefetch the data in response to a current request from the second communication device, and notify, in the case that the current prefetched data acquired by the prefetch request matches the prefetched data cached in the first cache, another relay device connected to the second communication device of a predetermined signal instructing a proxy response to the second communication device with the prefetched data cached in a second cache in the another relay device in response to a data request from the second communication device, the second cache to cache an amount of the prefetched data that enables performing the proxy response to the second communication device for a time equal to or longer than a processing time needed from a start of the data request from the second communication device to the first communication device to data acquisition by the first communication device for the second communication device.

3. A relay method for a relay device that is connected to a first communication device, reads data from the first communication device in response to a data request from a second communication device, and relays the read data to the second communication device, the relay method comprising:

sending a first request requesting, by the relay device, the first communication device to prefetch data in response to the data request from the second communication device;

caching, by the relay device, the prefetched data acquired by the prefetch request in a first cache; and sending a second request requesting, by the relay device, the first communication device to prefetch the data in response to a current request from the second communication device, and notifying, in the case that the current prefetched data acquired by the prefetch request matches the prefetched data cached in the first cache, another relay device connected to the second communication device of a predetermined signal instructing a proxy response to the second communication device with the prefetched data cached in a second cache in the another relay device in response to a data request from the second communication device, the second cache to cache an amount of the prefetched data that enables performing the proxy response to the second communication device for a time equal to or longer than a processing time needed from a start of the data request from the second communication device to the first communication device to data acquisition by the first communication device for the second communication device.

* * * * *